United States Patent
Xu et al.

(10) Patent No.: US 11,263,752 B2
(45) Date of Patent: Mar. 1, 2022

(54) COMPUTER-IMPLEMENTED METHOD OF DETECTING FOREIGN OBJECT ON BACKGROUND OBJECT IN AN IMAGE, APPARATUS FOR DETECTING FOREIGN OBJECT ON BACKGROUND OBJECT IN AN IMAGE, AND COMPUTER-PROGRAM PRODUCT

(71) Applicant: BOE Technology Group Co., Ltd., Beijing (CN)

(72) Inventors: Jingtao Xu, Beijing (CN); Jianwen Suo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 11 days.

(21) Appl. No.: 16/755,647

(22) PCT Filed: May 9, 2019

(86) PCT No.: PCT/CN2019/086213
§ 371 (c)(1),
(2) Date: Apr. 13, 2020

(87) PCT Pub. No.: WO2020/223962
PCT Pub. Date: Nov. 12, 2020

(65) Prior Publication Data
US 2021/0233245 A1     Jul. 29, 2021

(51) Int. Cl.
*G06T 7/11*     (2017.01)
*G06K 9/32*     (2006.01)
(Continued)

(52) U.S. Cl.
CPC .............. *G06T 7/11* (2017.01); *G06K 9/3233* (2013.01); *G06K 9/40* (2013.01); *G06K 9/4671* (2013.01); *G06T 7/194* (2017.01); *G06T 7/50* (2017.01)

(58) Field of Classification Search
USPC ........................................... 382/173, 260.275
See application file for complete search history.

(56) References Cited

U.S. PATENT DOCUMENTS 8,908,948 B2 * 12/2014 Fan ........................... G06T 7/11
                                                                                382/128
8,989,437 B2 * 3/2015 Wei ....................... G06K 9/3233
                                                                                382/103
(Continued)

FOREIGN PATENT DOCUMENTS

CN         103295219 A      9/2013

OTHER PUBLICATIONS

Li et al., Grab-Cut Image Segmentation Based on Image Region, 2018, IEEE 978-1-5386-4991-6/18, pp. 311-315. (Year: 2018).*
(Continued)

*Primary Examiner* — Ishrat I Sherali
(74) *Attorney, Agent, or Firm* — Intellectual Valley Law, P.C.

(57) ABSTRACT

A computer-implemented method of detecting a foreign object on a background object in a sample image is provided. The computer-implemented method includes extracting image features of the sample image; detecting a salient region in the sample image; and segmenting the salient region to determine a contour of a foreign object region based on results of segmenting the salient region. Segmenting the salient region is performed by an automatic Grabcut operation without user interaction.

18 Claims, 4 Drawing Sheets

(51) Int. Cl.
*G06T 7/194* (2017.01)
*G06T 7/50* (2017.01)
*G06K 9/40* (2006.01)
*G06K 9/46* (2006.01)

(56) References Cited

U.S. PATENT DOCUMENTS

| | | | | |
|---|---|---|---|---|
| 9,014,467 | B2* | 4/2015 | Hu | G06T 7/90 |
| | | | | 382/164 |
| 9,042,648 | B2* | 5/2015 | Wang | G06T 7/12 |
| | | | | 382/173 |
| 9,106,838 | B2* | 8/2015 | Fahn | G06K 9/4671 |
| 9,600,746 | B2* | 3/2017 | Ruan | G06K 9/6256 |
| 9,697,612 | B2* | 7/2017 | Wei | G06T 7/11 |
| 9,881,380 | B2* | 1/2018 | Sorkine Hornung | |
| | | | | G06K 9/00765 |
| 9,934,577 | B2* | 4/2018 | Dollar | G06K 9/4604 |
| 10,492,712 | B2* | 12/2019 | Schwartz | G16H 50/50 |
| 2002/0097436 | A1* | 7/2002 | Yokoyama | H04N 1/622 |
| | | | | 358/2.1 |
| 2010/0226564 | A1* | 9/2010 | March | G06K 9/469 |
| | | | | 382/159 |
| 2012/0288189 | A1 | 11/2012 | Hu et al. | |
| 2012/0294476 | A1 | 11/2012 | Wei et al. | |
| 2014/0254922 | A1* | 9/2014 | Wang | G06K 9/4671 |
| | | | | 382/159 |
| 2015/0206319 | A1 | 7/2015 | Dollar et al. | |
| 2015/0262039 | A1* | 9/2015 | Ruan | G06K 9/66 |
| | | | | 382/159 |
| 2021/0256291 | A1* | 8/2021 | Zhang | G06K 9/4652 |

OTHER PUBLICATIONS

Hailuo et al., Region Fusion and Grab-cut Based Salient Object Segmentation, 2014, IEEE 978-1-4799-4955-7/14, pp. 131-135. (Year: 2014).*

Dang et al., An Auto-selection Method for Saliency Detection and its Application to Segment the Object, 2012, IEEE 978-1-4673-2467-0/12, pp. 256-260. (Year: 2012).*

International Search Report & Written Opinion dated Feb. 12, 2020, regarding PCT/CN2019/086213.

* cited by examiner

COMPUTER-IMPLEMENTED METHOD OF DETECTING FOREIGN OBJECT ON BACKGROUND OBJECT IN AN IMAGE, APPARATUS FOR DETECTING FOREIGN OBJECT ON BACKGROUND OBJECT IN AN IMAGE, AND COMPUTER-PROGRAM PRODUCT

CROSS-REFERENCE TO RELATED APPLICATION

This application is a national stage application under 35 U.S.C. § 371 of International Application No. PCT/CN2019/086213, filed May 9, 2019, the contents of which are incorporated by reference in the entirety.

TECHNICAL FIELD

The present invention relates to image processing technology, more particularly, to a computer-implemented method of detecting a foreign object on a background object in an image, an apparatus for detecting a foreign object on a background object in an image, and a computer-program product.

BACKGROUND

In many scenarios, foreign object detection is helpful for performing or planning a task. For example, solar panels are often contaminated by foreign objects such as bird droppings and tree leaves. Due to the large surface area of solar panels in a solar panel farm, targeted cleaning of contaminated areas of the solar panels can be very difficult. Automatic foreign object detection in an image of the solar panels can facilitate the cleaning of the solar panel, specifically targeting those contaminated areas. In another example, foreign objects on a mask plate used in semiconductor fabrication can adversely affect the quality of the device fabricated. Thus, targeted cleaning of the mask plate would greatly benefit the fabrication process.

SUMMARY

In one aspect, the present invention provides a computer-implemented method of detecting a foreign object on a background object in a sample image, comprising extracting image features of the sample image; detecting a salient region in the sample image; and segmenting the salient region to determine a contour of a foreign object region based on results of segmenting the salient region; wherein segmenting the salient region is performed by an automatic Grabcut operation without user interaction.

Optionally, segmenting the salient region comprises automatically generating a rectangular region circumscribing the salient region; automatically generating an enlarged rectangular region by enlarging the rectangular region circumscribing the salient region; automatically combining live enlarged rectangular region with the sample image and performing a cropping operation on the sample image to generate a region-of-interest (ROI) image; automatically generating an initialization box based on the ROI image, the initialization box and the ROI image having a same aspect ratio; and automatically performing the automatic Grabcut operation using the ROI image and the initialization box as inputs.

Optionally, automatically generating the enlarged rectangular region comprises automatically generating an equi-directionally enlarged rectangular region by enlarging the rectangular region circumscribing the salient region at a same rate along all four sides of the rectangular region circumscribing the salient region, wherein the equi-directionally enlarged rectangular region and the rectangular region circumscribing the salient region have a same aspect ratio.

Optionally, automatically generating the enlarged rectangular region further comprises assigning the equi-directionally enlarged rectangular region as the enlarged rectangular region based on a determination that the equi-directionally enlarged rectangular region is within a boundary of sample image.

Optionally, automatically generating the enlarged rectangular region further comprises shrinking at least one side of the equi-directionally enlarged rectangular region to obtain a shrunk rectangular region based on a determination that the at least one side of the equi-directionally enlarged rectangular region is outside a boundary of sample image; and assigning, the shrunk rectangular region as the enlarged rectangular region based on a determination that the shrunk rectangular region is within a boundary of sample image.

Optionally, automatically generating the initialization box based on the ROI image comprises generating an equi-directionally shrunk rectangular region by shrinking a region corresponding to the ROI image at a same rate along all four sides of the region corresponding to the ROI image.

Optionally, automatically performing the automatic Grabcut operation using the ROI image and the initialization box as inputs comprises inputting the ROI image and the initialization box into the automatic Grabcut operation, generating background and detecting foreground based on the ROI image and the initialization box; and mapping the foreground onto the sample image to generate the foreign object region.

Optionally, generating the background and detecting the foreground comprises automatically assigning pixels in a region of the ROI image outside the initialization box as background pixels; automatically assigning pixels in a region of the ROI image inside the initialization box as undefined pixels; automatically reassigning the undefined pixels into the background pixels or foreground pixels using a modeling algorithm, and automatically detecting a boundary between the foreground pixels and the background pixels, thereby generating the background and the foreground.

Optionally, generating the background and detecting the foreground is performed using a gaussian mixture model algorithm.

Optionally, the computer-implemented method further comprises denoising an original image to generate the sample image; wherein denoising the original image comprises converting the original image into a grayscale image; removing a sub-image corresponding to a background object from the original image; and filling a removed region corresponding to the background object with an assigned grayscale value.

In another aspect, the present invention provides an apparatus for detecting a foreign object on a background object in a sample image, comprising a memory; and one or more processors; wherein the memory and the one or more processors are connected with each other; and the memory stores computer-executable instructions for controlling the one or more processors to extract image features of the sample image; detect a salient region in the sample image; and segment the salient region to determine a contour of a foreign object region based on results of segmenting the salient region; wherein segmenting the salient region is performed by an automatic Grabcut operation without user interaction.

Optionally, for segmenting the salient region, the memory stores computer-executable instructions for controlling the one or more processors to automatically generate a rectangular region circumscribing the salient region; automatically generate an enlarged rectangular region by enlarging the rectangular region circumscribing the salient region; automatically combine the enlarged rectangular region with the sample image and performing a cropping operation on the sample image to generate a region-of-interest (ROI) image; automatically generate an initialization box based on the ROI image, the initialization box and the ROI image having a same aspect ratio, and automatically perform the automatic Grabcut operation using the ROI image and the initialization box as inputs.

Optionally, for automatically generating the enlarged rectangular region, the memory stores computer-executable instructions for controlling the one or more processors to automatically generate an equi-directionally enlarged rectangular region by enlarging the rectangular region circumscribing the salient region at a same rate along all four sides of the rectangular region circumscribing the salient region, wherein the equi-directionally enlarged rectangular region and the rectangular region circumscribing the salient region have a same aspect ratio.

Optionally, for automatically generating the enlarged rectangular region, the memory further stores computer-executable instructions for controlling the one or more processors to assign the equi-directionally enlarged rectangular region as the enlarged rectangular region based on a determination that the equi-directionally enlarged rectangular region is within a boundary of sample image.

Optionally, for automatically generating the enlarged rectangular region, the memory further stores computer-executable instructions for controlling the one or more processors to shrink at least one side of the equi-directionally enlarged rectangular region to obtain a shrunk rectangular region based on a determination that the at least one side of the equi-directionally enlarged rectangular region is outside a boundary of sample image; and assign the shrunk rectangular region as the enlarged rectangular region based on a determination that the shrunk rectangular region is within a boundary of sample image.

Optionally, for automatically generating the initialization box based on the ROI image, the memory further stores computer-executable instructions for controlling the one or more processors to generate an equi-directionally shrunk rectangular region by shrinking a region corresponding to the ROI image at a same rate along all four sides of the region corresponding to the ROI image.

Optionally, the memory further stores computer-executable instructions for controlling the one or more processors to input the ROI image and the initialization box into the automatic Grabcut operation; generate background and detecting foreground based on the ROI image and the initialization box; and map the foreground onto the sample image to generate the foreign object region.

Optionally, for generating the background and detecting the foreground the memory further stores computer-executable instructions for controlling the one or more processors to automatically assign pixels in a region of the ROI image outside the initialization box as background pixels; automatically assign pixels in a region of the ROI image inside the initialization box as undefined pixels; automatically reassign the undefined pixels into the background pixels or foreground pixels using a modeling algorithm; and automatically detect a boundary between the foreground pixels and the background pixels, thereby generating the background and the foreground.

Optionally, the apparatus further comprises an image capturing device configured to obtain the sample image having the foreign object on the background object.

In another aspect, the present invention provides a computer-program product comprising a non-transitory tangible computer-readable medium having computer-readable instructions thereon, the computer-readable instructions being executable by a processor to cause the processor to perform extracting image features of a sample image; detecting a salient region in the sample image; and segmenting the salient region to determine a contour of a foreign object region based on results of segmenting the salient region; wherein segmenting the salient region is performed by an automatic Grabcut operation without user interaction.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Grabcut algorithm has been used for image segmentation (see, e.g., C. Rother, V. Kolmogorov, and A. Black, "GrabCut-interactive foreground extraction using iterated graph cuts" in ACM Transactions on Graphics, 2004, vol. 23 no. 3, pp. 309-314, which is hereby incorporated by reference in its entirety). In GrabCut image segmentation, an iterative optimization process can be applied to estimate foreground and background. This approach alternates between enforcing intra-region pixel label homogeneity and applying graph-cut optimization (max-flow min-cut) to infer pixel labels with color distribution of foreground objects and background modeled using a Gaussian mixture model. However, the conventional Grabcut algorithm requires user interaction, and cannot be performed automatically.

Accordingly, the present disclosure provides, inter alia, a computer-implemented method of detecting a foreign object on a background object in an image, an apparatus for detecting a foreign object on a background object in an image, and a computer-program product that substantially obviate one or more of the problems due to limitations and disadvantages of the related art. In one aspect, the present disclosure provides a computer-implemented method of detecting a foreign object om a background object in an image. In some embodiments, the computer-implemented method includes extracting image features of the sample image; detecting a salient region in the sample image; and segmenting the salient region to determine a contour of a foreign object region based on results of segmenting the salient region. Optionally, segmenting the salient region is performed by an automatic Grabcut operation without user interaction.

Figure 1:
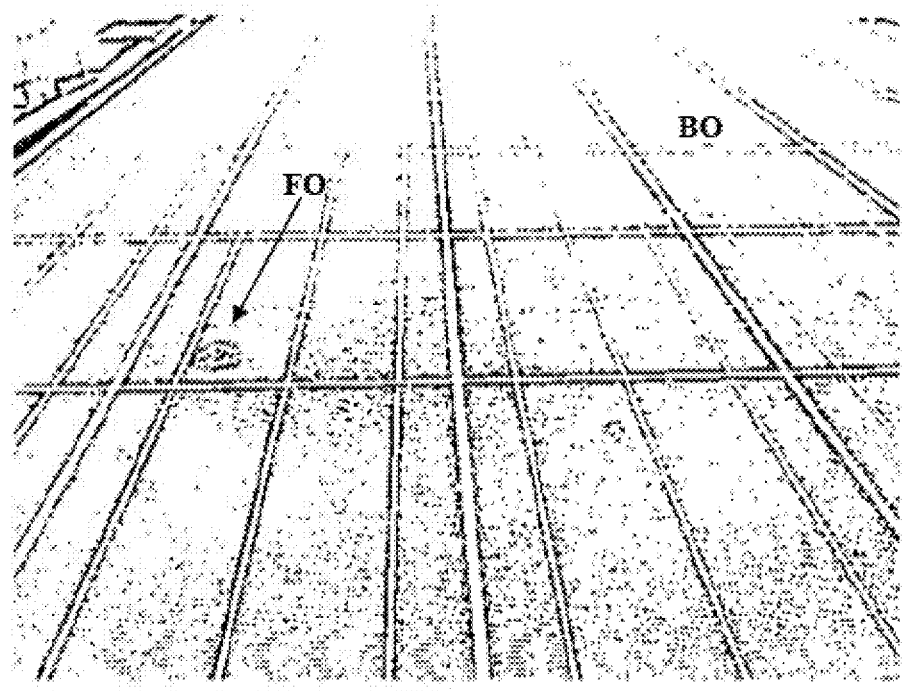
FIG. 1 is an image having a foreign object on a background object in some embodiments according to the present disclosure.
Figure 2:
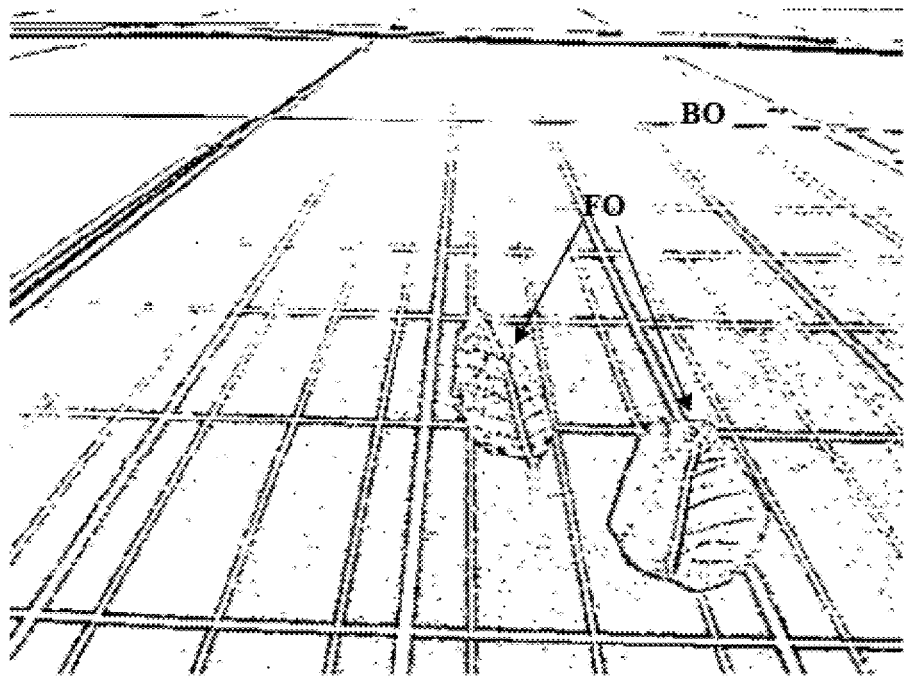
FIG. 2 is an image having a foreign object on a background object in some embodiments according to the present disclosure.

FIG. 1 is an image having a foreign object on a background object in some embodiments according to the present disclosure. FIG. 2 is an image having a foreign object on a background object in some embodiments according to the present disclosure Referring to FIG. 1, the background object BO is a photovoltaic panel (solar panel) having a foreign object FO (e.g., a bird dropping) on the photovoltaic panel. Referring to FIG. 2, the background object BO is a photovoltaic panel having a foreign object FO (e.g., a leaf) cat the photovoltaic panel. The present method provides a novel algorithm for automatically identifying a foreign object FO and automatically classifying the foreign object FO into an object type in an image (e.g., a visible light image) The algorithm includes steps of detecting a salient region in the image and segmenting the salient region to determine, a contour of a foreign object region based on results of segmenting the salient region. The present method may be applied to detect a foreign object on a background object in complex scenarios. Examples of applications of the present method include detection of a foreign object on a photovoltaic panel, detecting a foreign object on a mask plate used in semiconductor fabrication, and target detection on the sea. For example, the uppermost layer of the photovoltaic panel is made of glass, and reflection and refraction of ambient light on the photovoltaic panel make foreign object detection a complex issue. The present method has been used in foreign object detection cm the photovoltaic panel regardless of weather conditions and time of the day. The present method can work with any appropriate images, e.g., images captured using wide-angle lenses or normal lenses. Also, the present method can be used for foreign object detection in real-time and when the camera undergoes a motion relative to the background object (e.g., the photovoltaic panel).

Figure 3:
FIG. 3 illustrates image features and salient region masks of several exemplary images in some embodiments according to the present disclosure.

Various appropriate image features may be extracted based on image characteristics of the background object and a suspected foreign object. Examples of appropriate image features include hue features, local binary pattern (LBP) texture features, brightness features, and saturation features FIG. 3 illustrates image features and salient region masks of several exemplary images in some embodiments according to the present disclosure Referring to FIG. 3, exemplary images include images of two foreign objects (bird dropping and leaf) and a background object (photovoltaic panel without foreign object). As shown in FIG. 3, hue features and LBP texture features of the images can be extracted based on the image characteristics of the background object and the foreign object.

In some embodiments, the image can be converted into a plurality of color channels, e.g., a red color channel, a green color channel, and a blue color channel. Optionally, a respective image feature may be calculated as a mean of values from the plurality of color channels. For example, a brightness feature may be calculated as a mean of brightness values of the plurality of color channels.

In some embodiments, the LBP texture features may be calculated based on Equation (1):

$$LBP(x_c, y_c) = \sum_{p=1}^{8} s(I(p) - I(c)) * 2^p;; \quad (1)$$

wherein $$s(x) = \begin{cases} 1, x \geq 0 \\ 0, \text{otherwise} \end{cases};$$

I(c) is the grayscale value of a target pixel; I(p) is the grayscale value of a neighboring pixel adjacent to the target pixel; p is a total number of the neighboring pixels; $(x_c, y_c)$ stands for the coordinate of the target pixel. Optionally, p=8.

Specifically, in one example, the method includes dividing a candidate image into a plurality of cells, optionally each of which includes at least 8 pixels. The grayscale value (or illuminance value) of a pixel is compared to eight neighboring pixels (upper-left, upper middle, upper right, left, right, lower-left, lower-middle, and lower-right). The s(x) in Equation (1) is a threshold function, when the pixel's value is greater than that of a neighbor's pixel, a "1" is assigned by the threshold function; otherwise a '0' is assigned by the threshold function. An eight-digit binary number is obtained as the LBP texture feature for the pixel. Optionally, a histogram of the frequency of each eight-digit binary number occurring is computed, and optionally normalized. The histograms (optionally normalized histograms) are concatenated to generate feature vectors of the cell.

In some embodiments, image features include color characteristic features. Optionally, the method includes first converting the image in an RGB space into an image in a HIS space, wherein H stands for hue feature, I stands for brightness feature, and S stands for saturation feature. The hue feature may be calculated according to Equation (2);

$$H = \begin{cases} \theta, G \geq B \\ 2\pi - \theta, G < B \end{cases}; \quad (2)$$

wherein $$\theta = \cos^{-1}\left(\frac{(R-G) + (R-B)}{2\sqrt{(R-G)^2 + (R-B)(G-B)}}\right),$$

R stands for red color grayscale, G stands for green color grayscale, and B stands for blue color grayscale.

In some embodiments, the saturation feature may be calculated according to Equation (3):

$$S = 1 - \frac{3 \min(R, G, B)}{R + G + B}; \quad (3)$$

wherein R stands for red color grayscale, G stands for green color grayscale, and B stands for blue color grayscale.

In some embodiments, the brightness feature may be calculated according to Equation (4):

$$I = \frac{R+G+B}{3}; \quad (4)$$

wherein R stands for red color grayscale. G stands for green color grayscale, and B stands for blue color grayscale.

In some embodiments, a salient region in the image is detected based on a human visual attention model, and information regarding the salient region can then be obtained. Various appropriate salient region detection algorithm such as a frequency-tuned (FT) salient region detection algorithm may be used in detecting the salient region. Optionally, the salient region may be refined based on characteristics (e.g., shape) of an initially detected salient region. For example, the salient region may be refined based an aspect ratio of the initially detected salient region and/or a compactness of the shape of the initially detected salient region, to generate a refined salient region, which is then used in subsequent steps of the method.

In some embodiments, the salient region in the image is detected by a FT salient region detection algorithm. In one example, a Gaussian smoothing operation is first applied to the image. The method then includes converting the image in an RGB space into an image in a CIElab space. The CIElab color model compensates for the deficiencies of the RGB and CMYK color models. The CIElab color model is a device-independent color model based on physiological features. The CIElab color model consists of three elements, including an illuminance channel (L) and two color channels (a and b). The a channel corresponds to a color from dark green (low illuminance value) to gray (medium illuminance value) and to bright pink (high illuminance value). The b channel corresponds to a color from bright blue (low illuminance value) to gray (medium illuminance value) and to yellow (high illuminance value).

Specifically, the image in the RGB space is first converted into an image in a XYZ space based on Equation (5):

$$\begin{bmatrix} X \\ Y \\ Z \end{bmatrix} = M * \begin{bmatrix} R \\ G \\ B \end{bmatrix}; \quad (5)$$

$$\text{wherein } M = \begin{bmatrix} 0.4124 & 0.3576 & 0.1805 \\ 0.2126 & 0.7152 & 0.0722 \\ 0.0193 & 0.1192 & 0.9505 \end{bmatrix}.$$

The image in the XYZ space is then converted into an image in a LAB space based on Equations (6)-(8).

$$L^* = 116 f(Y/Y_n) - 16 \quad (6);$$

$$a^* = 500[f(X/X_n) - f(Y/Y_n)] \quad (7);$$

$$b^* = 200[f(Y/Y_n) - f(Z/Z_n)] \quad (8);$$

$$\text{wherein } f(t) = \begin{cases} t^{1/3}, & t > \left(\frac{6}{29}\right)^3 \\ \frac{1}{3}\left(\frac{29}{6}\right)^2 t + \frac{4}{29}, & \text{otherwise} \end{cases}.$$

wherein $X_n=1$, $Y_n=1$, $Z_n=1$. For $f(X/X_n)$, t stands for $X/X_n$. For $f(Y/Y_n)$, t stands for $Y/Y_n$. For $f(Z/Z_n)$, t stands for $Z/Z_n$. The f(t) is a threshold function, when t is greater than (6/29), a "$t^{1/3}$" is assigned by the threshold function; otherwise $$\text{``}\frac{1}{3}*\left(\frac{29}{6}\right)^2*t+\frac{4}{29}\text{''}$$

is assigned by the threshold function.

Optionally, a mean of tire three channels L, a, and b of the image is calculated. Optionally, Euclidean distances between the mean of the three channels and L, a, b values of each pixel in the image is calculated, thereby obtain a plurality of salient maps. Optionally, the plurality of salient maps are normalized (e.g., scaled), followed by adaptive threshold segmentation to obtain a binary image of the salient region. The connected area in the binary image is extracted, thereby obtaining the salient region.

In some embodiments, the step of segmenting the salient region is performed by an automatic Grabcut operation without user interaction. In some embodiments, the automatic Grabcut operation includes one or any combination of the following steps: (1) automatically generating a rectangular region circumscribing the salient region; (2) automatically generating an enlarged rectangular region by enlarging the rectangular region circumscribing the salient region; (3) automatically combining the enlarged rectangular region with the sample image and performing a cropping operation on the sample image to generate a region-of-interest (ROI) image; (4) automatically generating an initialization box based on the ROI image, the initialization box and the ROI image having a same aspect ratio; and (5) automatically performing the automatic Grabcut operation using the ROI image and the initialization box as inputs.

Figure 4A:
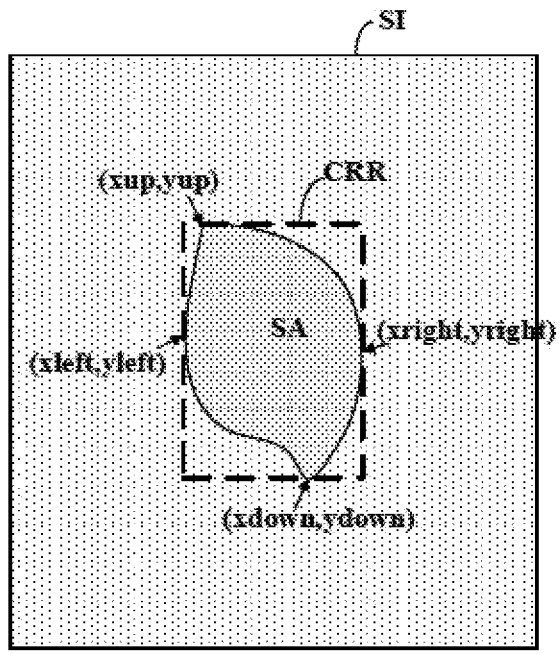
FIGS. 4A to 4D illustrate a method of segmenting a salient region using an automatic Grabcut operation without user interaction in some embodiments according to the present disclosure.

FIGS. 4A to 4D illustrate a method of segmenting a salient region using an automatic Grabcut operation without user interaction in some embodiments according to the present disclosure. Referring to FIG. 4A, a salient region SA is detected in a sample image SI. A rectangular region circumscribing the salient region CRR is automatically generated. In one example, the rectangular region circumscribing the salient region CRR can be generated by using outmost border points of the salient region SA, e.g., (xup, yup), (xdown,ydown), (xleft,yleft), (xright,yright) to determine coordinates of four corners of the rectangular region circumscribing the salient region CRR, e.g., (xleft,yup), (xright,yup), (xleft,ydown), (xright,ydown), thereby automatically generating the rectangular region circumscribing the salient region CRR.

Figure 4B:
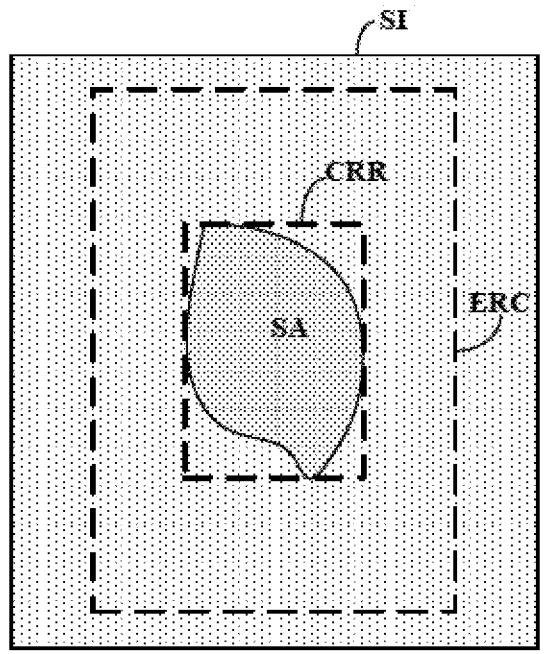
Figure 4C:
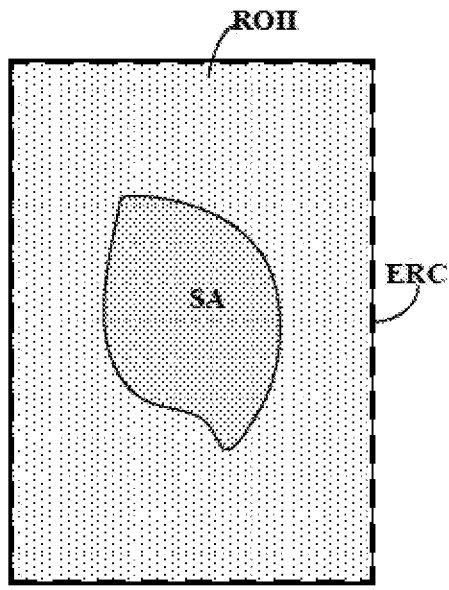

Referring to FIG. 4B, the method further includes automatically generating an enlarged rectangular region ERC by enlarging the rectangular region circumscribing the salient region CRR. Optionally, as shown in FIG. 4B, the enlarged rectangular region ERC is an equi-directionally enlarged rectangular region, and automatically generating the enlarged rectangular region ERC includes automatically generating an equi-directionally enlarged rectangular region by enlarging the rectangular region circumscribing the salient region CRR at a same rate along all four sides of the rectangular region circumscribing the salient region CRR, wherein the equi-directionally enlarged rectangular region and the rectangular region circumscribing the salient region CRR have a same aspect ratio. The equi-directionally enlarged rectangular region is assigned as the enlarged rectangular region ERC. Optionally, as shown in FIG. 4B, the operation can be performed particularly when the equi-directionally enlarged rectangular region is within a boundary of sample image SI.

Optionally, the enlarged rectangular region ERC and the rectangular region circumscribing the salient region CRR are co-centered, and have a same aspect ratio. Optionally, the enlarged rectangular region ERC has a width that is M times (M>1, e.g., twice) of a width of the rectangular region circumscribing the salient region CRR; and the enlarged rectangular region ERC has a length that is N tunes (N>1, e.g., twice) of a length of the rectangular region circumscribing the salient region CRR Referring to FIG. 4C, the method further includes automatically combining the enlarged rectangular region with the sample image and performing a cropping operation on the sample image to generate a region-of-interest (ROI) image ROII.

Figure 4D:
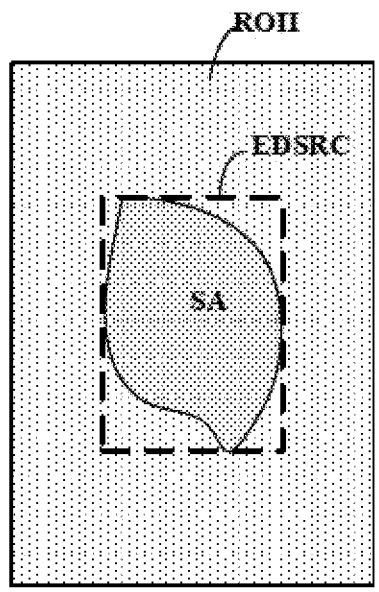

Referring to FIG. 4D, the method further includes generating an equi-directionally shrunk rectangular region EDSRC by shrinking a region corresponding to the ROI image ROG at a same rate along all four sides of the region corresponding to the ROI image. Optionally, the region corresponding to the ROI image ROII and the equi-directionally shrunk rectangular region EDSRC are co-centered, and have a same aspect ratio. Optionally, the region corresponding to the ROI image ROG has a width that is P times (P>1. e.g., twice) of a width of the equi-directionally shrunk rectangular region EDSRC; and the region corresponding to the ROI image ROII has a length that is Q tunes (Q>1, e.g., twice) of a length of the equi-directionally shrunk rectangular region EDSRC. Based on the equi-directionally shrunk rectangular region EDSRC, the method generates an initialization box corresponding to the equi-directionally shrunk rectangular region EDSRC. The initialization box and the ROI image have a same aspect ratio.

Figure 5E:
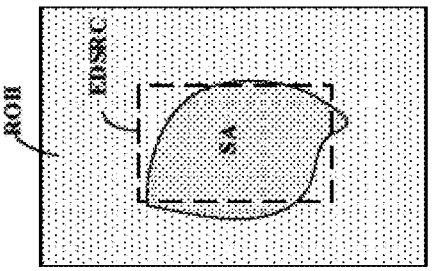
FIGS. 5A to 5E illustrate a method of segmenting a salient region using an automatic Grabcut operation without user interaction in some embodiments according to the present disclosure.
Figure 5B:
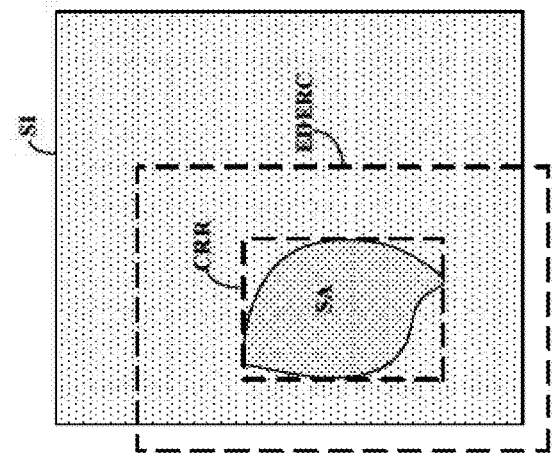
Figure 5D:
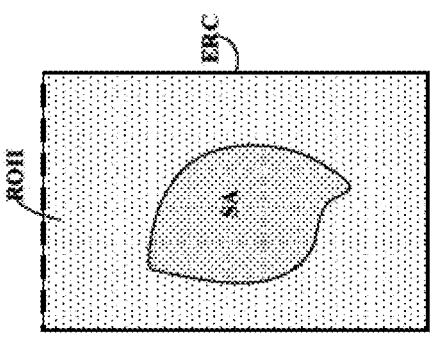
Figure 5A:
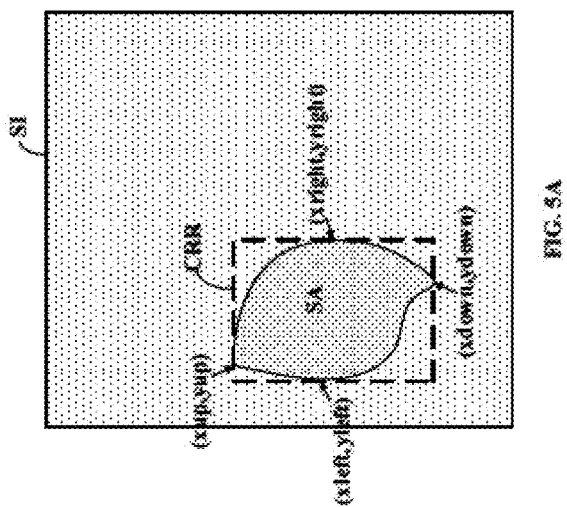

FIGS. 5A to 5E illustrate a method of segmenting a salient region using an automatic Grabcut operation without user interaction in some embodiments according to the present disclosure. Referring to FIG. 5A, a salient legion SA is detected in a sample image SI. A rectangular region circumscribing the salient region CRR is automatically generated. In one example, the rectangular region circumscribing the salient region CRR can be generated by using outmost border points of the salient region SA, e.g., (xup,yup), (xdown,ydown), (xleft,yleft), (xright,yright) to determine coordinates of four corners of the rectangular region circumscribing the salient region CRR, e.g., (xleft,yup), (xright,yup), (xleft,ydown), (xright,ydown), thereby automatically generating the rectangular region circumscribing the salient region CRR.

Referring to FIG. 5B, the method further includes automatically generating an enlarged rectangular region ERC by enlarging the rectangular region circumscribing the salient region CRR Optionally, as shown in FIG. 5B, automatically generating the enlarged rectangular region ERC includes first automatically generating an equi-directionally enlarged rectangular region EDERC by enlarging the rectangular region circumscribing the salient region CRR at a same rate along all four sides of the rectangular region circumscribing the salient region CRR, wherein the equi-directionally enlarged rectangular region EDERC and the rectangular region circumscribing the salient region CRR have a same aspect ratio. However, as shown in FIG. 5B, at least one side of the equi-directionally enlarged rectangular region EDERC is outside a boundary of sample image SI.

Optionally, the equi-directionally enlarged rectangular region EDERC and the rectangular region circumscribing the salient region CRR are concentered, and have a same aspect ratio. Optionally, the equi-directionally enlarged rectangular region EDERC has a width that is M tunes (M>1, e.g., twice) of a width of the rectangular region circumscribing the salient region CRR; and the equi-directionally enlarged rectangular region EDERC has a length that is N times (N>1, e.g., twice) of a length of the rectangular region circumscribing the salient region CRR.

Figure 5C:
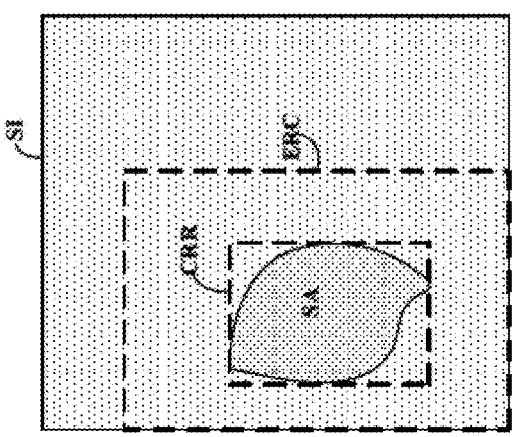

Referring to FIG. 5B and FIG. 5C, the step of automatically generating, the enlarged rectangular region ERC further includes shrinking at least one side of the equi-directionally enlarged rectangular region EDERC to obtain a shrunk rectangular region based on a determination that the at least one side of the equi-directionally enlarged rectangular region EDERC is outside a boundary of sample image SI; and assigning the shrunk rectangular region as the enlarged rectangular region ERC based on a determination that the shrunk rectangular region is within a boundary of sample image SI.

Referring to FIG. 5D, the method further includes automatically combining the enlarged rectangular region with the sample image and performing a cropping operation on the sample image to generate a region-of-interest (ROI) image ROII.

Referring to FIG. 5E, the method further includes generating an equi-directionally shrunk rectangular region EDSRC by shrinking a region corresponding to the ROI image ROII at a same rate along all four sides of the region corresponding to the ROI image. Optionally, the region corresponding to the ROI image ROII and the equi-directionally shrunk rectangular region EDSRC are equi-centered, and have a same aspect ratio. Optionally, the region corresponding to the ROI image ROII has a width that is P times (P>1, e.g., twice) of a width of the equi-directionally shrunk rectangular region EDSRC; and the region corresponding to the ROI image ROII has a length that is Q times (Q>1, e.g., twice) of a length of the equi-directionally shrunk rectangular region EDSRC. Based on the equi-directionally shrunk rectangular region EDSRC, the method generates an initialization box corresponding to the equi-directionally shrunk rectangular region EDSRC. The initialization box and the ROI image have a same aspect ratio.

In some embodiments, the automatic Grabcut operation is automatically performed using the ROI image ROII and the initialization box as inputs. The method optionally includes inputting the ROI image and the initialization box into the automatic Grabcut operation, generating background and detecting foreground based on the ROI image and the initialization box; and mapping the foreground onto the sample image to generate the foreign object region.

In some embodiments, the step of generating the background and detecting the foreground includes automatically assigning pixels in a region of the ROI image outside the initialization box as background pixels; automatically assigning pixels in a region of the ROI image inside the initialization box as undefined pixels; automatically reassigning the undefined pixels into the background pixels or foreground pixels using a modeling algorithm; and automatically detecting a boundary between the foreground pixels and the background pixels, thereby generating the background and the foreground.

In some embodiments, generating the background and detecting the foreground is performed using a Gaussian Mixture Model (GMM) algorithm. Optionally, the Gaussian Mixture Model algorithm is a full covariance Gaussian Mixture Model algorithm, using K numbers of Gaussian components (e.g., K=5) in an RGB color space. In one example, the method includes assigning the initialization box as a potential target area, and assigning the image area outside of the initialization box as background. For the image in the RGB color space, the Gaussian Mixture Model algorithm is used to model the background and foregrounds and the undefined pixels are marked as possible foreground or possible background. Each pixel in the image is considered to be connected to surrounding pixels by a virtual edge, and each edge has a probability of belonging to the foreground or the background, based on its similarity to the surrounding pixels. Each pixel (e.g., a node in the algorithm) is connected to a foreground node or a background node After node connection is complete (each node possibly connected to the background or the foreground), if an edge between the nodes belongs to different terminals (e.g., one node belongs to the foreground and the other node belongs to the background), the segmentation is performed (e.g., by the max flow/min cut algorithm) to sever the edge between the nodes. The operation separates the foreground from the background, thereby generating the foreground. The foreground is then mapped onto the sample image to generate the foreign object region.

In some embodiments, the sample image is an image processed from an original image. For example, a photovoltaic panel image typically includes alternating grid lines on the surface. Without pre-processing the original photovoltaic panel image, the texture features extracted from the original image would inevitably be affected by the noise of the grid lines. Accordingly, in some embodiments, the method further includes denoising an original image to generate the sample image. In some embodiments, the step of denoising the original image includes converting the original image into a grayscale image; removing a sub-image corresponding to a background object from the original image; and filling a removed region corresponding to the background object with an assigned grayscale value.

In one example, the original image is an image of a photovoltaic panel. The denoising method includes converting the image of the surface of the photovoltaic panel into a grayscale image, calculating the sum of the gray values of each row and column of the grayscale image; locating the grid line region and removing the grid line region in the photovoltaic panel surface image based on a simple threshold judgment; performing quadratic polynomial fitting, using a feast squares method, thereby obtaining the grayscale values of the grid line region, and filling the removed grid line region; and combining the filled image in three channels of the color space (e.g., R, G, B channels of an RGB color space) into an output image, thereby generating the sample image for subsequent processes.

In some embodiments, the method further includes generating a salient region mask based on defection of the salient region; obtaining the image features in a region surrounded by the salient region mask; performing feature combination and feature vector length normalization on the image features of the region surrounded by the salient region mask to generate normalized feature vectors; and identifying the suspected foreign object using an image classifier, wherein the image classifier uses the normalized feature vectors as input for identifying the suspected foreign object.

Optionally, performing feature combination and feature vector length normalization includes first performing feature combination on the training image features of the region surrounded by the training salient region mask to generate training one-dimensional feature vectors; followed by performing feature vector length normalization on the training one-dimensional feature vectors to generate the training normalized feature vectors. Optionally, performing feature combination and feature vector length normalization includes first performing feature vector length normalization on the training image features of the region surrounded by the training salient region mask to generate normalized training feature vectors; followed by performing feature combination on the normalized training feature vectors to generate the training normalized feature vectors.

In some embodiments, subsequent to obtain the salient region mask, the method further includes performing feature combination on the image features of the region surrounded by the salient region mask to generate one-dimensional feature vectors. Optionally, the image features extracted from the image include features of a first type and features of a second type; and the step of performing feature combination on the image features includes combining a respective one of the features of the first type and a respective one of the features of the second type into a respective one of the one-dimensional feature vectors. Optionally, image features of more than two types may be combined into the one-dimensional feature vectors. In one example, the features of the first type are hue features, and the features of the second type are LBP texture features.

In some embodiments, subsequent to feature combination, the method further includes performing feature vector length normalization on the one-dimensional feature vectors to generate normalized feature vectors. Optionally, the feature sector length normalization is a feature vector length scaling. The normalized (or optionally scaled) feature vectors (e.g., normalized one-dimensional feature vectors) are used as inputs to an image classifier for identifying a suspected foreign object in the image. Optionally, the image classifier is a pre-trained image classifier. Optionally, in the process of feature vector length normalization, the hue components of the one-dimensional feature vectors are normalized with respect to each other, and the LBP texture features components of the one-dimensional feature vectors are normalized with respect to each other.

In one example, the feature combination process is performed prior to the feature vector length normalization process. Optionally, a respective one of the features of the first type and a respective one of the features of the second type are combined into a respective one of the one-dimensional feature vectors. The feature vector length normalization is then performed on the combined one-dimensional feature vectors. The hue components of the one-dimensional feature vectors are normalized with respect to each other, and the LBP texture features components of the one-dimensional feature vectors are normalized with respect to each other, thereby obtaining normalized one-dimensional feature vectors.

In another example, the feature vector length normalization process is performed prior to the feature combination process. Optionally, the hue components of the one-dimensional feature vectors are normalized with respect to each oilier, and the LBP texture features components of the one-dimensional feature vectors are normalized with respect to each other. The respective one of the normalized features of the first type and a respective one of the normalized features of the second type are combined into a respective one of the one-dimensional feature vectors, thereby obtaining normalized one-dimensional feature vectors.

Optionally, the method further includes outputting a classification label corresponding to the suspected foreign object and a relative location of the suspected foreign object on the background object.

In some embodiments, the method further includes determining a color consistency of the region surrounded by the salient region mask. If it is determined that the color consistency of the region surrounded by the salient region mask is equal to or above a threshold color consistency value (indicating the color is sufficiently consistent), a classification label corresponding to the suspected foreign object and a relative location of the suspected foreign object on the background object are outputted.

If it is determined that the color consistency of the region surrounded by the salient region mask is below the threshold color consistency value (indicating the color is not sufficiently consistent), the method optionally further includes segmenting the salient region into a plurality of sub-regions; and determining a contour of a refined salient region based on results of segment mg the salient region into the plurality of sub-regions.

Optionally, the step of determining the color consistency includes calculating variance of hue features of the region surrounded by the salient region mask; and determining whether the variance of the hue features is greater than a first threshold value. The variance of the hue features being greater than the first threshold value indicates the color consistency of the region surrounded by the salient region mask being below a second threshold value. The variance of the hue features being equal to or less than the first threshold value indicates the color consistency of the region surrounded by the salient region mask is equal to or greater than the second threshold value.

In another aspect the present disclosure provides an apparatus for detecting a foreign object on a background object in an image. In some embodiments, the apparatus includes a memory; and one or more processors. The memory and the one or more processors are connected with each other. In some embodiments, the memory stores computer-executable instructions for controlling the one or more processors to extract image features of the sample image; detect a salient region in the sample image; and segment the salient region to determine a contour of a foreign object region based on results of segmenting the salient region. Optionally, segmenting the salient region is performed by an automatic Grabcut operation without user interaction.

As used herein, the term "processor" refers to a physical device that can perform computations. Examples of processors include a central processing unit (CPU), a microprocessor unit (MPU), a microcontroller unit (MCU), an application-specific instruction set processor (ASIP), a graphics processing unit (GPU), physics processing unit (PPU), a digital system processor (DSP), a reduced instruction set (RISC) processor, an image processor, a coprocessor, a floating-point unit, a network processor, a multi-core processor, a front-end processor, a field-programmable gate array (FPGA), a video processing unit, a vision processing unit, a tensor processing unit (TPU), a neural processing unit (NPU), a system on a chip (SOC), and others.

In some embodiments, for segmenting the salient region, the memory stores computer-executable instructions for controlling the one or more processors to automatically generate a rectangular region circumscribing the salient region; automatically generate an enlarged rectangular region by enlarging the rectangular region circumscribing the salient region; automatically combine the enlarged rectangular region with the sample image and performing a cropping operation on the sample image to generate a region-of-interest (ROI) image; automatically generate an initialization box based on the ROI image, the initialization box and the ROI image having a same aspect ratio; and automatically perform the automatic Grabcut operation using the ROI image and the initialization box as inputs.

In some embodiments, for automatically generating the enlarged rectangular region, the memory stores computer-executable instructions for controlling the one or more processors to automatically generate an equi-directionally enlarged rectangular region by enlarging the rectangular region circumscribing the salient region at a same rate along all four sides of the rectangular region circumscribing the salient region, wherein the equi-directionally enlarged rectangular region and the rectangular region circumscribing the salient region have a same aspect ratio. Optionally, for automatically generating the enlarged rectangular region, the memory further stores computer-executable instructions for controlling the one or more processors to assign the equi-directionally enlarged rectangular region as the enlarged rectangular region based on a determination that the equi-directionally enlarged rectangular region is within a boundary of sample image. Optionally, for automatically generating the enlarged rectangular region, the memory further stores computer-executable instructions for controlling the one or more processors to shrink at least one side of the equi-directionally enlarged rectangular region to obtain a shrunk rectangular region based on a determination that the at least one side of the equi-directionally enlarged rectangular region is outside a boundary of sample image; and assign the shrunk rectangular region as the enlarged rectangular region based on a determination that the shrunk rectangular region is within a boundary of sample image.

In some embodiments, for automatically generating the initialization box based on the ROI image, the memory further stores computer-executable instructions for controlling the one or mare processors to generate an equi-directionally shrunk rectangular region by shrinking a region corresponding to the ROI image at a same rate along all four sides of the region corresponding to the ROI image.

In some embodiments, the memory further stores computer-executable instructions for controlling the one ROI more processors to input the ROI image and the initialization box into the automatic Grabcut operation; generate background and detecting foreground based on the ROI image and the initialization box; and map the foreground onto the sample image to generate the foreign object region. Optionally, for generating the background and detecting the foreground, the memory further stores computer-executable instructions for controlling the one or more processors to automatically assign pixels in a region of the ROI image outside the initialization box as background pixels; automatically assign pixels in a region of the ROI image inside the initialization box as undefined pixels; automatically reassign the undefined pixels into the background pixels or foreground pixels using a modeling algorithm; and automatically detect a boundary between the foreground pixels and the background pixels, thereby generating the background and the foreground.

Optionally, the apparatus further includes an image capturing device configured to obtain the sample image having the foreign object on the background object.

In another aspect, the present disclosure provides a computer-program product comprising a non-transitory tangible computer-readable medium hating computer-readable instructions thereon, the computer-readable instructions being executable by a processor to cause the processor to perform extracting image features of a sample image; detecting a salient region in the sample image; and segmenting the salient region to determine a contour of a foreign object region based on results of segmenting the salient region. Optionally, segmenting the salient region is performed by an automatic Grabcut operation without user interaction.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method of detecting a foreign object on a background object in a sample image, comprising:
    extracting image features of the sample image by one or more processors;
    detecting a salient region in the sample image by the one or more processors; and
    segmenting, by the one or more processors, the salient region to determine a contour of a foreign object region based on results of segmenting the salient region;
    wherein segmenting the salient region is performed by an automatic Grabcut operation without user interaction;
    wherein segmenting the salient region comprises:
    automatically generating, by the one or more processors, a rectangular region circumscribing the salient region;
    automatically generating, by the one or more processors, an enlarged rectangular region by enlarging the rectangular region circumscribing the salient region;
    automatically combining, by the one or more processors, the enlarged rectangular region with the sample image and performing a cropping operation on the sample image to generate a region-of-interest (ROI) image;
    automatically generating, by the one or more processors, an initialization box based on the ROI image, the initialization box and the ROI image having a same aspect ratio; and
    automatically performing, by the one or more processors, the automatic Grabcut operation using the ROI image and the initialization box as inputs.

2. The computer-implemented method of claim 1, wherein automatically generating the enlarged rectangular region comprises automatically generating an equi-directionally enlarged rectangular region by enlarging the rectangular region circumscribing the salient region at a same rate along all four sides of the rectangular region circumscribing the salient region, wherein the equi-directionally enlarged rectangular region and the rectangular region circumscribing the salient region have a same aspect ratio.

3. The computer-implemented method of claim 2, wherein automatically generating the enlarged rectangular region further comprises assigning the equi-directionally enlarged rectangular region as the enlarged rectangular region based on a determination that the equi-directionally enlarged rectangular region is within a boundary of the sample image.

4. The computer-implemented method of claim 2, wherein automatically generating the enlarged rectangular region further comprises shrinking at least one side of the equi-directionally enlarged rectangular region to obtain a shrunk rectangular region based on a determination that the at least one side of the equi-directionally enlarged rectangular region is outside a boundary of sample image; and
    assigning the shrunk rectangular region as the enlarged rectangular region based on a determination that the shrunk rectangular region is within a boundary of the sample image.

5. The computer-implemented method of claim 1, wherein automatically generating the initialization box based on the ROI image comprises generating an equi-directionally shrunk rectangular region by shrinking a region corresponding to the ROI image at a same rate along all four sides of the region corresponding to the ROI image.

6. The computer-implemented method of claim 1, wherein automatically performing the automatic Grabcut operation using the ROI image and the initialization box as inputs comprises:
    inputting the ROI image and the initialization box into the automatic Grabcut operation;
    generating background and detecting foreground based on the ROI image and the initialization box; and
    mapping the foreground onto the sample image to generate the foreign object region.

7. The computer-implemented method of claim 6, wherein generating the background and detecting the foreground comprises:
    automatically assigning pixels in a region of the ROI image outside the initialization box as background pixels;
    automatically assigning pixels in a region of the ROI image inside the initialization box as undefined pixels;
    automatically reassigning the undefined pixels into the background pixels or foreground pixels using a modeling algorithm; and
    automatically detecting a boundary between the foreground pixels and the background pixels, thereby generating the background and the foreground.

8. The computer-implemented method of claim 7, wherein generating the background and detecting the foreground is performed using a gaussian mixture model algorithm.

9. The computer-implemented method of claim 1, further comprising denoising an original image to generate the sample image;
wherein denoising the original image comprises:
converting the original image into a grayscale image;
removing a sub-image corresponding to a background object from the original image; and
filling a removed region corresponding to the background object with an assigned grayscale value.

10. An apparatus for detecting a foreign object on a background object in a sample image, comprising:
a memory; and
one or more processors;
wherein the memory and the one or more processors are connected with each other; and
the memory stores computer-executable instructions for controlling the one or more processors to:
extract image features of the sample image;
detect a salient region in the sample image; and
segment the salient region to determine a contour of a foreign object region based on results of segmenting the salient region;
wherein segmenting the salient region is performed by an automatic Grabcut operation without user interaction;
wherein, for segmenting the salient region, the memory stores computer-executable instructions for controlling the one or more processors to:
automatically generate a rectangular region circumscribing the salient region;
automatically generate an enlarged rectangular region by enlarging the rectangular region circumscribing the salient region;
automatically combine the enlarged rectangular region with the sample image and performing a cropping operation on the sample image to generate a region-of-interest (ROI) image;
automatically generate an initialization box based on the ROI image, the initialization box and the ROI image having a same aspect ratio; and
automatically perform the automatic Grabcut operation using the ROI image and the initialization box as inputs.

11. The apparatus of claim 10, wherein, for automatically generating the enlarged rectangular region, the memory stores computer-executable instructions for controlling the one or more processors to automatically generate an equi-directionally enlarged rectangular region by enlarging the rectangular region circumscribing the salient region at a same rate along all four sides of the rectangular region circumscribing the salient region, wherein the equi-directionally enlarged rectangular region and the rectangular region circumscribing the salient region have a same aspect ratio.

12. The apparatus of claim 11, wherein, for automatically generating the enlarged rectangular region, the memory further stores computer-executable instructions for controlling the one or more processors to assign the equi-directionally enlarged rectangular region as the enlarged rectangular region based on a determination that the equi-directionally enlarged rectangular region is within a boundary of the sample image.

13. The apparatus of claim 11, wherein, for generating the enlarged rectangular region, the memory further stores computer-executable instructions for controlling the one or more processors to:
shrink at least one side of the equi-directionally enlarged rectangular region to obtain a shrunk rectangular region based on a determination that the at least one side of the equi-directionally enlarged rectangular region is outside a boundary of sample image; and
assign the shrunk rectangular region as the enlarged rectangular region based on a determination that the shrunk rectangular region is within a boundary of the sample image.

14. The apparatus of claim 10, wherein, for automatically generating the initialization box based on the ROI image, the memory further stores computer-executable instructions for controlling the one or more processors to generate an equi-directionally shrunk rectangular region by shrinking a region corresponding to the ROI image at a same rate along all four sides of the region corresponding to the ROI image.

15. The apparatus of claim 10, wherein the memory further stores computer-executable instructions for controlling the one or more processors to:
input the ROI image and the initialization box into the automatic Grabcut operation;
generate background and detecting foreground based on the ROI image and the initialization box; and
map the foreground onto the sample image to generate the foreign object region.

16. The apparatus of claim 15, wherein, for generating the background and detecting the foreground, the memory further stores computer-executable instructions for controlling the one or more processors to:
automatically assign pixels in a region of the ROI image outside the initialization box as background pixels;
automatically assign pixels in a region of the ROI image inside the initialization box as undefined pixels;
automatically reassign the undefined pixels into the background pixels or foreground pixels using a modeling algorithm; and
automatically detect a boundary between the foreground pixels and the background pixels, thereby generating the background and the foreground.

17. The apparatus of claim 10, further comprising an image capturing device configured to obtain the sample image having the foreign object on the background object.

18. A computer-program product comprising a non-transitory tangible computer-readable medium having computer-readable instructions thereon, the computer-readable instructions being executable by a processor to cause the processor to perform:
extracting image features of a sample image;
detecting a salient region in the sample image; and
segmenting the salient region to determine a contour of a foreign object region based on results of segmenting the salient region;
wherein segmenting the salient region is performed by an automatic Grabcut operation without user interaction;
wherein segmenting the salient region comprises:
automatically generating a rectangular region circumscribing the salient region;
automatically generating an enlarged rectangular region by enlarging the rectangular region circumscribing the salient region;
automatically combining the enlarged rectangular region with the sample image and performing a cropping operation on the sample image to generate a region-of-interest (ROI) image;

automatically generating an initialization box based on the ROI image, the initialization box and the ROI image having a same aspect ratio; and automatically performing the automatic Grabcut operation using the ROI image and the initialization box as inputs.

* * * * *